United States Patent

[11] 3,599,330

[72] Inventor Jacob A. Ronning
 3525 Irving Ave. South, Minneapolis, Minn. 55408
[21] Appl. No. 44,527
[22] Filed June 8, 1970
[23] Division of Ser. No. 632,629, Apr. 21, 1967, Pat. No. 3,558,384.
[45] Patented Aug. 17, 1971

[54] UNDERCUTTING TOOL
 6 Claims, 6 Drawing Figs.
[52] U.S. Cl. ............................................. 30/300
[51] Int. Cl. ............................................ B26b 3/08
[50] Field of Search ................................. 30/300,
 310, 320; 77/58.41; 145/124; 30/1, 162, 165, 263, 264, 276

[56] References Cited
UNITED STATES PATENTS

| | | | |
|---|---|---|---|
| 2,515,810 | 7/1950 | Tornborg | 77/58.41 X |
| 2,594,671 | 4/1952 | McTyre | 77/58.41 X |
| 2,663,203 | 12/1953 | Fried | 77/58.41 X |
| 3,019,712 | 2/1962 | Winberry | 77/58.41 X |
| 3,195,378 | 7/1965 | Cogsdill | 77/58.41 X |

Primary Examiner—Robert C. Riordon
Assistant Examiner—J. C. Peters
Attorney—Carlsen, Carlsen and Sturm ABSTRACT: A cutting tool having a shank adapted to be rotated from one end and having flexible cutters mounted in and axially adjustable with respect to the shank for projection radially outwardly from the other end of the shank so as to operate in a plane perpendicular to the shank axis, with means for adjusting the cutters longitudinally of the shank during rotation thereof to thereby control the effective cutting diameter of the cutting elements.

PATENTED AUG 17 1971 3,599,330
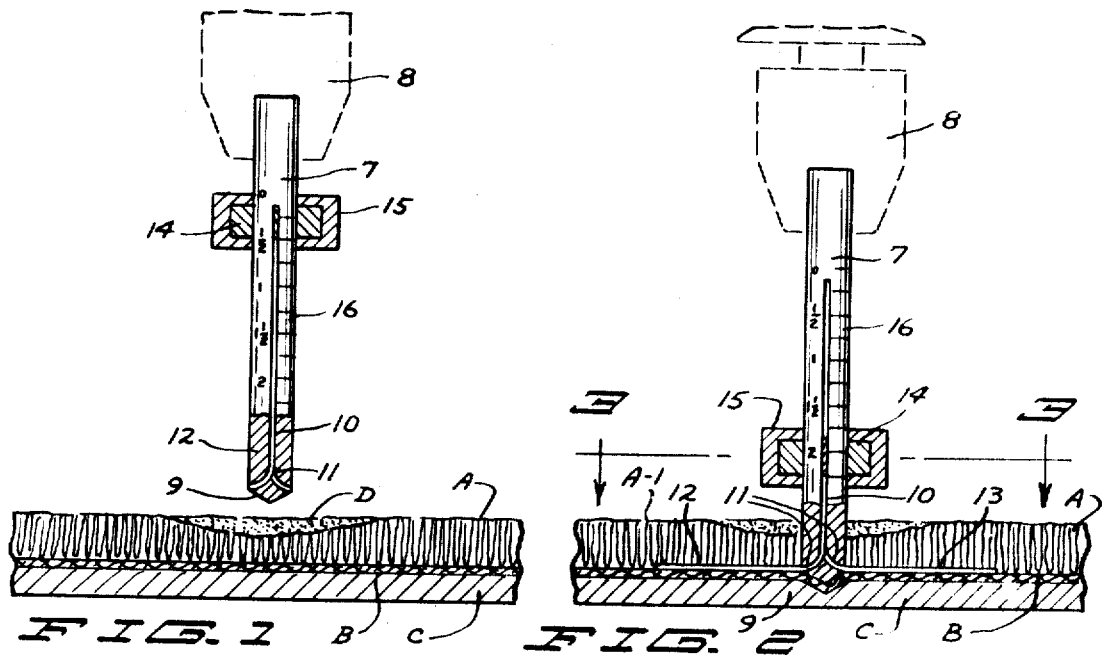
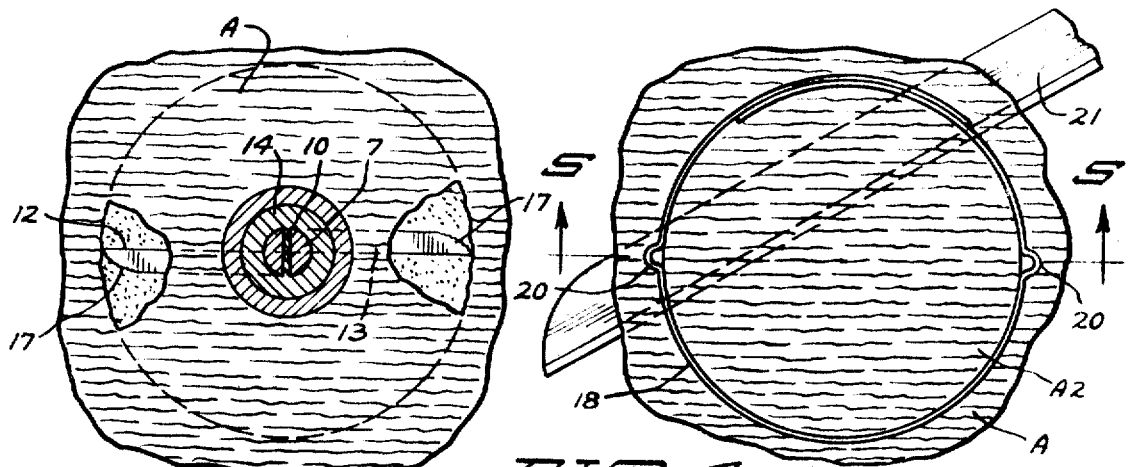
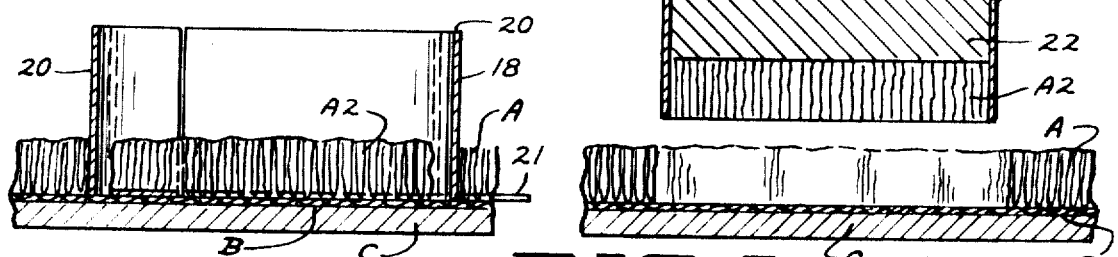
INVENTOR.
JACOB A. RONNING
BY
Carlson, Carlson & Sturm
ATTORNEYS

UNDERCUTTING TOOL

This application is a division from my copending application Ser. No. 632,629, filed Apr. 21, 1967, now Pat. No. 3,558,384, and the cutting tool as herein disclosed was specifically designed for carrying out the method set forth and claimed in that application, which discloses the same construction of cutting tool That method, as more fully set forth in the parent application, relates to the repairing of spot damaged carpeting, and includes the steps of employing the tool to remove a damaged section of pile from the base material of the carpet, and then substituting that section with a section of undamaged carpeting preferably cut with the same tool.

While the cutting tool, with or without some modification, may be used for other purposes, it is here only specifically referred to in connection with its carpet repairing function, and essentially includes a shank or stem adapted to be held in and rotated by a manually manipulatable power unit, together with one or more flexible or bendable cutters that are mounted in the shank for axial adjustment therein, but which during rotation may be radially extended from the terminal end of the shank to undercut the pile section immediately above the base area to which the section is normally attached.

In the accompanying drawing, which illustrates a preferred embodiment of the invention, FIG. 1 is a cross section of a damaged portion of carpeting with the cutting tool positioned directly above the damaged spot or area, and with the tool itself also shown partially in section.

FIG. 2 is a view similar to FIG. 1, but showing the tool in its lowermost position, and with its cutters radially extended.

FIG. 3 is a plane view partly in section, as on line 3–3 in FIG. 2.

FIG. 4 is a plan view of a carpet piece from which the replacement section of pile is to be taken, and further illustrating devices for severing and transferring the same.

FIG. 5 is a vertical section on the line 5–5 in FIG. 4.

FIG. 6 is a section similar to FIG. 5, but showing a further progression in the section transferring operation.

Referring to the drawing more particularly and by reference characters A designates the pile of a carpet or rug having a base B, the same resting in normal manner on floor C. D represents a spot or area that has been damaged by a burn, scorch or other cause. The object is to remove the damaged section of pile from the underlying base and replace it with a similar section, taken from a spare piece or if necessary from a part of the carpet that is normally concealed from open view, so that the repaired area will not present an objectionable appearance, and so that the repairing operation will in no way interfere with the strength or stability of the carpet elements worked on.

The device shown for removing the damaged section of pile consists of a shank 7 adapted to have its upper end inserted and secured in the socket, indicated by dotted lines 8, of a conventional electric hand drill, or other suitably powered holder, whereby it may be conveniently manipulated. The lower end of the shank is pointed, as at 9, so that it can be pressed down through the pile and into the base material as indicated in FIG. 2.

Extending diametrically across the shank is an elongated slot 10 terminating, immediately above the point 9, in a pair of relatively offset outlets 11 that curve outwardly in opposite directions to form guides for a pair of cutter blades 12 and 13. These blades may be formed from the same piece of resilient or flexible spring steel, but in any event, if two blades re employed, their upper ends are laterally connected to a collar 14 that rotates with the shank and blades, but is rotatable within an outer collar or knob 15 that is grasped by the operator when a blade adjustment is being made.

Thus, while the shank is being rotated, and the blades contracted, as in FIG. 1, the unit is moved down into the middle of the damaged area D until the point 9 is well down into the base B, at which time the outlets 11 are disposed at a level immediately above the base. With his other hand the operator then grasps the knob 15 and pushes it downwardly, thus gradually projecting the blades horizontally to the extent that it is necessary to remove the entire damaged area of the pile. The circular block or pad of pile material, indicated at A1 in FIGS. 2 and 3, that has thus been severed, is removed and discarded, leaving an empty circular recess in the carpet having the now exposed face of the base B for its bottom.

It may here be noted that the shank 7 is provided with a scale 16 with indicia that may be read in conjunction with the upper surface of the knob 15 to indicate the diameter of the recess that has been cut. Also that the cutting operation may be facilitated by serrating the leading outer edges of the blades 12 and 13, as indicated at 17 in FIG. 3.

The replacement section A2 of pile material that is to next occupy the circular recess is, as above indicated, taken from a spare or normally concealed piece of carpeting, but its removal and transfer requires greater care as it condition and appearance must be retained as near normal as possible until the transition is completed.

To this end I provide a sleeve 18 having slidably overlapped portions 19 so that the diameter of the sleeve may be adjusted. Preferably this diameter should be slightly greater than the scale indicated diameter of the section A1 that has been removed. The sleeve is then pressed down into the pile, as indicated in FIGS. 4 and 5, and it will be noted that the sleeve is provided with a pair of diametrically opposed vertical ribs 20 which serve as index devices to assist in properly placing the section A2 in the cleaned out recess when patterns and pile weaves must be taken into consideration.

As above suggested the cutter mechanism shown in FIGS. 1, 2 and 3 may be employed to sever the section A2 from the base beneath it. In some instances, however and particularly where the cutting may be done from the side rather than from above, and also when the texture of the pile is such that it might be disturbed and disrupted by a fast moving rotary cutter, it is found expedient to undercut the section by a simple but very sharp knife 21. Such a knife, as illustrated in FIGS. 4 and 5, is forced under the sleeve 18 and with a slicing action completely severs the section A2 while the sleeve assists in keeping the section intact.

To further assist in preventing disruption of the section A2 the sleeve 18 may be contracted sufficiently to compact and present a slight grip on the section. To still further maintain its condition a spatula-type plate may be inserted under the section, or in fact the knife blade 21 might be broad enough to serve such purpose.

As a still further precaution against disruption of the section A2 a circular block of wood or other suitable material 22, of a predetermined diameter to correspond with the contracted sleeve 18, may be inserted directly above the section A2. This will not only serve to prevent upward buckling of the section but can also be employed to exert a uniform pressure on it when it is to be discharged and pressed down into its new location.

Before the final step of pressing the new section A2 down into the recess from which section A1 has been removed, provision must be made for retaining it in place and this is done by covering the now exposed upper face of the base material B with a suitable adhesive. This may consist of glue or paste depending on various conditions, and in some instances it may be feasible to merely insert in the recess a precut element having adhesive surfaces on both sides and from which protecting coatings have been removed.

In any event, when the operation is completed the equipment is removed and the new section is merely stepped on to force it down to its normal surface level where it will be permanently retained by whatever adhesive is used, and with a little practice the results are such that the repaired area will be completely free of the unsightly damage.

Having now illustrated and described a preferred embodiment of my invention, what I claim to be new and desire to protect by Letters Patent is:

1. A cutting tool comprising a shank adapted to be rotated from one end, a flexible cutter mounted in and axially adjustable with respect to said shank, means for adjusting the cutter longitudinally of the shank during rotation thereof, and means adjacent the end of the shank opposite said one end for flexing and protecting the cutter outwardly therefrom, whereby it will be operative to cut in a generally radial plane.

2. The tool set forth in claim 1 wherein the shank is pointed at the end from which the cutter is flexed and projected.

3. The tool set forth in claim 1 wherein the shank is provided with indicia operative to indicate the extent to which the cutter is projected from the shank.

4. A cutting tool comprising a shank adapted to be rotated from one end, at least two flexible cutters mounted in the shank for axial adjustment therein and for projection therefrom in different outward directions during rotation of the shank, such projection into different directions being permitted by reason of such cutter flexibility.

5. The tool set forth in claim 4 wherein means is provided for simultaneously adjusting the cutters axially in the shank during its rotation.

6. The tool set forth in claim 4 wherein said cutters are formed of resilient spring metal.

UNITED STATES PATENT OFFICE
CERTIFICATE OF CORRECTION

Patent No. 3,599,330  Dated August 17, 1971

Inventor(s) Jacob A. Ronning

It is certified that error appears in the above-identified patent and that said Letters Patent are hereby corrected as shown below:

In claim 1 (Col. 3), line 6, change the word "protecting" to projecting.

Signed and sealed this 7th day of March 1972.

(SEAL)
Attest:

EDWARD M. FLETCHER, JR.  ROBERT GOTTSCHALK
Attesting Officer  Commissioner of Patents